United States Patent Office 3,014,592
Patented Dec. 26, 1961

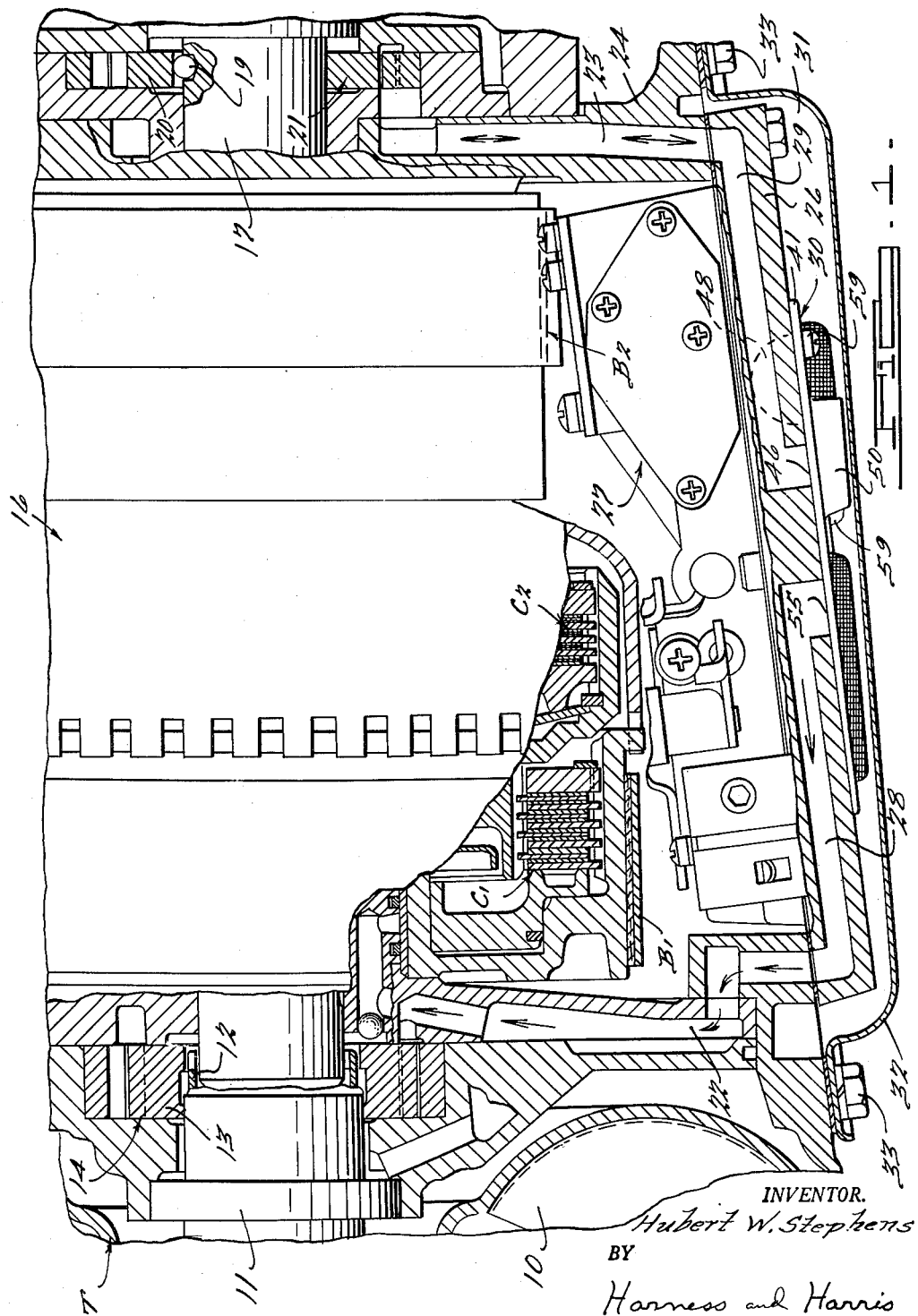

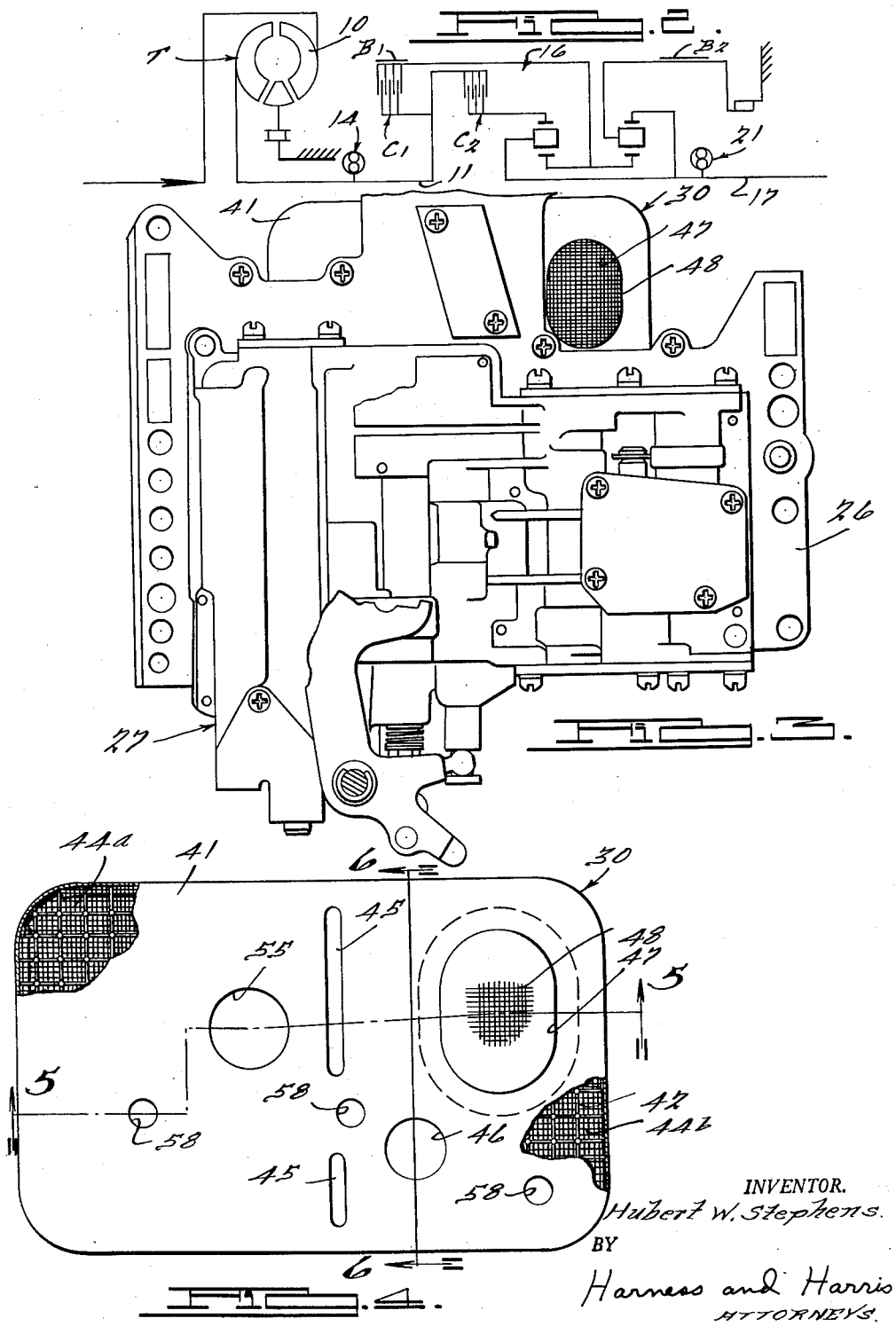

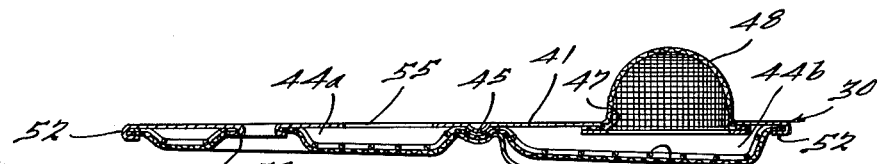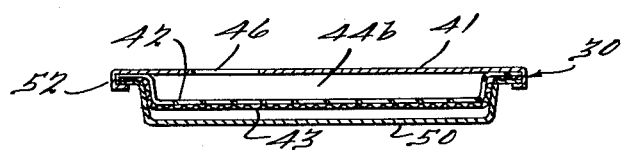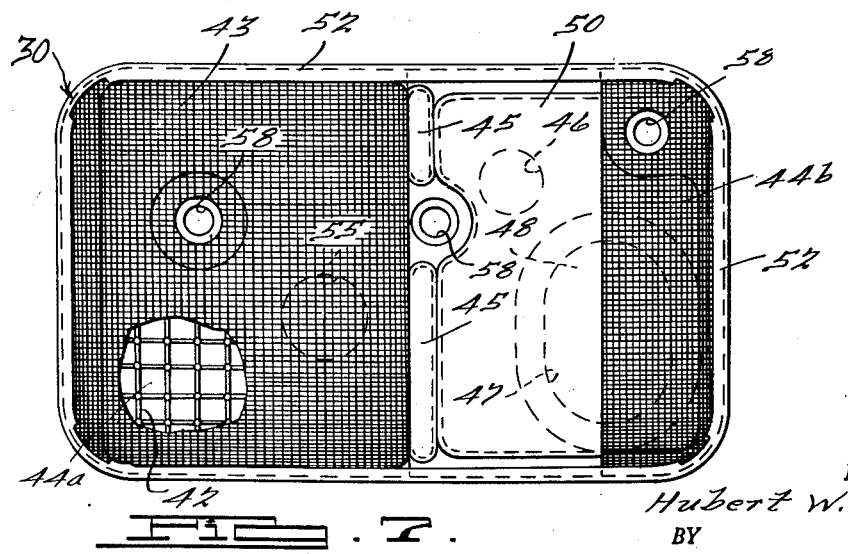

3,014,592
TRANSMISSION OIL STRAINER
Hubert W. Stephens, Lake Orion, Mich., assignor to Chrysler Corporation, Highland Park, Mich., a corporation of Delaware
Filed Oct. 12, 1959, Ser. No. 846,015
9 Claims. (Cl. 210—168)

This invention relates to an oil strainer adapted for use in the oil sump of a power transmission unit that utilizes a plurality of pumps for the supply of pressurized fluid to the transmission hydraulic controls and lubrication system.

It is a primary object of this invention to provide an oil strainer device for a multi-pump power transmission unit oil sump such that the strainer will prevent aeration of the pressure fluid supply as a result of reverse rotation of one or more of the several pumps.

It is a further object of this invention to provide a transmission oil sump strainer having separated compartments for connection to the several pump supply conduits which compartments are arranged to prevent direct fluid flow between the several outlet ports of the strainer that are connected to the pump supply conduits.

It is still another object of this invention to provide a transmission oil sump strainer that includes separated oil intake compartments that are connected to the different oil pumps with baffle means between the compartments to prevent direct fluid flow between the several compartments.

It is still another object of this invention to provide an oil strainer with baffle means as well as air trap means to provide for the escape of oil entrapped air that might be supplied to one of the compartments by one pump while the other compartment is connected to the suction side of another pump.

It is still another object of this invention to provide a multi-compartment oil strainer having baffle means between certain of the strainer compartments and air trap means for at least one of the compartments to facilitate escape of the oil entrapped air before passage of the oil between the several compartments.

Other objects and advantages of this invention will become readily apparent from a reading of the following description and a consideration of the related drawings wherein:

FIG. 1 is a fragmentary sectional elevational view of a hydraulically operated power transmission unit such as is used in current types of motor vehicles which transmission includes an oil sump strainer embodying this invention;

FIG. 2 is a schematic diagram of a gear train that might be used in the power transmission unit shown in FIG. 1;

FIG. 3 is a top plan view of the transfer plate and valve body that is shown connected to the underside of the power transmission unit in FIG. 1;

FIG. 4 is a top plan view of the oil strainer unit embodying this invention, which strainer unit is shown attached to the underside of the transfer plate in FIGS. 1 and 3;

FIG. 5 is a sectional elevational view of the oil strainer shown in FIG. 4, the view being taken on the line of and in the direction of the arrows 5—5 of FIG. 4;

FIG. 6 is a sectional elevational view of the oil strainer shown in FIG. 4, the view being taken along the line of and in the direction of the arrows 6—6 of FIG. 4; and FIG. 7 is a bottom plan elevational view, with parts broken away, of the oil strainer shown in FIGS. 3 through 6.

FIG. 1 of the drawings shows a portion of a hydraulically operated power transmission unit T that is adapted to serve as part of the drive train of a motor vehicle or the like. The transmission T includes at its input end a hydrodynamic power transmission unit 10, such as a fluid coupling or torque converter, that is drivingly connected to the transmission input shaft 11. The transmission input shaft 11 is drivingly connected by key means 12 to the drive rotor 13 of a pressure fluid supply pump generally designated by the numeral 14. It is thought to be understood that the transmission input shaft 11 is connected by the hydrodynamic power transmitter 10 to the crankshaft of the associated engine (not shown) so that the front pump 14 is engine driven. Transmission T includes gearing, generally designated by the numeral 16, that is adapted to provide for the transmission of forward and reverse drives between the transmission input shaft 11 and the transmission output shaft 17. The transmission output shaft 17 is connected by pin means 19 to the drive rotor 20 of a rear pump generally designated by the reference numeral 21. Because the pump 21 is connected to the transmission output shaft 17 it is thought to be obvious that the rear pump 21 is arranged to be drivingly connected to the propeller shaft and driving wheels (not shown) of the vehicle that utilizes this transmission unit. This transmission T is described in detail in the copending application of B. W. Cartwright et al., Serial No. 787,556 filed January 19, 1959.

The transmission T (see FIG. 1) is provided with suitable fluid conduits 22 and 23 respectively that provide oil supply passages to the front and rear pumps 14 and 21. The oil supply conduits 22 and 23 are shown as bores in the casing or housing 24 of the transmission T although these supply passages could be tubing or similar fluid conduit means that would not actually be integral with the transmission casing 24. Connected to the underside of the transmission casing 24 is a bored transfer plate 26 that has the transmission control valve body 27 mounted on its upper side. Valve body 27 will not be described in detail as it does not form a part of this invention. Connected to the lower side of the transfer plate 26 is the oil strainer 30 that embodies this invention. Transfer plate 26 includes bored passages 28 and 29 that are arranged to connect the oil strainer 30 to the front and rear pump supply conduits 22 and 23 respectively. The transfer plate 26 and valve body 27, as well as the oil strainer 30, are located at the bottom of the transmission T in the area normally denoted the transmission oil sump. This sump 31 is formed by the cover plate or pan 32 that is detachably connected to the underside of the transmission casing 24 by the bolts 33. It is thought to be obvious that there is an oil sump supply port (not shown) that permits the filling of the sump area 31 with suitable oil or other fluid that can be utilized for both lubricating the transmission unit T and supplying the pressurized fluid required for the operation of the hydrodynamic power transmitter 10 and the several clutches $C_1$, $C_2$, brake bands $B_1$, $B_2$, valves, servo means, and the like (not shown) that might be associated with the gearing 16 of the transmission. It is to be understood that the term hydraulic controls as used in connection with this invention includes both lubricating means as well as the fluid operated means for the actuation of the servos, clutches, and the like.

Before going forward with the description of the fluid strainer unit 30 that forms the essence of this invention, it will be helpful to point out the problem that has previously existed in hydraulic controls systems of the disclosed type prior to this invention. With a brief explanation of the problems that have previously existed it is thought that it will be quite obvious how this invention has overcome the previous difficulties and provided an improved type of oil strainer for transmission use. With a two pump power transmission unit wherein the so-called front pump 14 is engine driven and the so-called rear pump 21 is output shaft driven, it is thought to be clear that the front pump 14 will always rotate in a forward direction whenever the vehicle engine is operating. On the other hand, the so-called rear pump 21, which is connected to the transmission output shaft 17, can be rotated in either forward or reverse directions depending on the type of drive that is being transmitted through the transmission gear unit 16. For normal forward drive below a certain predetermined speed both the front pump 14 and the rear pump 21 are operable to produce pressurized fluid for the hydraulic control system. It is the usual practice, however, to have some sort of by-pass valve control such that when a certain predetermined vehicle speed has been reached that the pumping action of the front pump 14 will be by-passed and thereafter the rear pump 21 will take over the complete supply of the required pressurized fluid. If the transmission is placed in reverse drive then the rear pump 21 is driven reversely by the output shaft 17 so that the rear pump inlet conduit 23. 29 then becomes a discharge passage. At this time the rear pump 21 takes in some air which is discharged through the connected conduits 23, 29 and this air tends to aerate or foam the oil that is being discharged from the conduits 23, 29. As the front pump 14, which is always driven forwardly by the input shaft 11, is withdrawing oil from the sump 31 at the same time that the rear pump 21 is pumping aerated oil into the sump 31 there is the danger that the front pump 14 will suck in the aerated oil being discharged by the rear pump 21 unless some means is provided to separate the rear pump discharge from the front pump suction so that the air discharged from the rear pump discharge conduits 23, 29 can escape to the top of the oil surface in the sump 31 before the oil is drawn into the front pump suction conduits 28, 22. If means are not provided to prevent direct fluid flow from the rear pump discharge port to the front pump suction port, when the rear pump is being driven reversely, the aerated oil discharged from the rear pump 21 will be passed into the hydraulic control system by the front pump 14. Aerated oil passed into the hydraulic control system which is intended for solid oil only will cause malfunctioning of the transmission clutches and the brake servos, frothing and overheating of the torque converter unit, and various other troubles that originate from the fact that solid oil is not being provided for supply to the hydraulic control system.

The oil strainer 30 that forms a basic part of this invention is essentially a thin flat casing having a perforated top or base plate 41 that is bolted to the underside of the transmission transfer plate 26. Plate 41 has connected to its underside a relatively stiff, open mesh, dished layer of hardware cloth 42 that is covered by a layer of relatively fine wire mesh or other type of filter cloth 43. The hardware cloth 42 is adapted to retain the filter cloth 43 in spaced relationship to the plate 41 so that there will be filter chambers 44a and 44b provided between the plate 41 and the filtering screens 42, 43. It will be noted that the strainer 30 is divided into two filter chambers or compartments, denoted 44a and 44b, by virtue of the connected wall portions 45 which extend transversely of the filter unit 30 substantially midway of its length. The portion of the strainer on the right side of the dividing wall 45 (see FIGS. 4 and 5), which includes the filter chamber 44b, has a port 46 in the overlying base plate 41 which port is connected to the conduit 29 in transfer plate 26 so as to provide means for the transfer of filtered oil from the sump 31 to the rear pump 21. The portion of the plate 41 overlying the filter chamber 44b is also provided with an enlarged aperture 47 that receives a dome-shaped filter screen 48 which provides an air trap for the separation of air from the aerated oil produced by the rear pump 21 during reverse drive thereof. This air separating action will be subsequently described. Beneath the screened undersurface of the filter unit compartment 44b and extending rightwardly from the division wall 45 is a dished baffle plate 50. Baffle plate 50 extends the full width of the strainer 30 and, as can be clearly shown in FIG. 7, it is placed directly beneath the port 46 in plate 41 that is connected to the rear pump 21. The baffle plate 50, the filter screen 43, the supporting wire cloth 42, and the cover plate 41 (see FIGS. 5 and 6) are joined into a unitary assembly by the folded over edges 52 of the plate 41 or by any other type of connecting means adapted for the joining of superimposed layers of materials.

The portion of the upper plate 41 that overlies the filter chamber 44a is pierced by a port 55 that is adapted to be connected to the front pump supply conduit 28 in the transfer plate 26 (see FIG. 1). At spaced locations across the length of the filter 30 hollow rivets 58 connect together the superimposed layers of material 41, 42 and 43 and provide bores to receive bolts 59 that will fixedly anchor the strainer 30 to the underside of the transfer plate 26. It will be noted from a consideration of FIGS. 3 and 5 that the air trap 48 connected to the filter chamber 44b extends upwardly from the top surface of the base plate 41. The filter trap 48 is so placed on the strainer plate 41 that it is clear of interference with the portions of the valve body 27 that support the strainer 30.

With the arrangement shown in the drawings and hereinbefore described, it is thought to be clear that whenever the rear pump 21 is being driven in reverse and tending to pump air and/or aerated oil in a reverse direction from port 46 back into the sump 31 that this air or aerated oil will impinge against the baffle plate 50 and be prevented from flowing directly across the filter towards the port 55 in the filter chamber 44a that is connected to the front pump suction. When air and/or aerated oil is being discharged from the port 46 against the inner side of the baffle plate 50 the entrapped air has a tendency to rebound from the plate 50 and pass upwardly through the large air trap 48 which provides a large area escape surface. The oil that is separated during this baffle spraying process settles to the bottom of the sump 31 and can thereafter pass over into the filter chamber 44a for subsequent delivery through the port 55 to the suction side of the front pump 14. As a result of the formation of the oil filter 30 with separate filter compartments 44a, 44b having baffle means therebetween to prevent direct fluid flow from the rear pump port 46 to the front pump suction port 55, the possibility of introduction of aerated oil into the hydraulic control system by the front pump 14 is substantially eliminated. The use of a baffle plate 50 disposed below the rear pump port 46 has another advantage in that when the rear pump is operating in reverse and tending to discharge air and aerated oil into the sump 31 the spray stream from port 46 will not be directed against the floor of the sump 31 and tend to stir up any sediment deposited on the floor of the sump 31. The circulation of sediment by the oil spray is bad because the sediment would thereafter be picked up by the oil and drawn through the filter screens 42, 43 into the filter chambers 44a and 44b. This invention shows an economical, efficient manner of constructing an oil sump filter or strainer for a multi-pump system such that the problems associated with aeration of oil during reverse pump drive are substantially eliminated.

I claim:
1. In an engine driven power transmission unit including an engine driven input shaft and an output shaft arranged to be drivingly connected by gearing for the transmission of a forward and a reverse drive, hydraulically operated control means for said transmission comprising a fluid sump, a fluid strainer in said sump, a first pump drivingly connected to said input shaft, a second pump drivingly connected to said output shaft, and first and second conduit means connecting said strainer respectively to said first and second pumps, said strainer comprising a casing having a pair of strainer compartments each of which has an outlet port connected to a different one of said conduits and a portion of its compartment walls formed of fluid filter material, said compartments being separated by baffle means that prevents a direct fluid flow path from the outlet port in one com- partment to the outlet port in the other compartment, and one of said compartments having an air escape trap means in a wall thereof.

2. In an engine driven power transmission unit including an engine driven input shaft and an output shaft arranged to be drivingly connected by gearing for the transmission of a forward and a reverse drive, hydraulically operated control means for said transmission comprising a fluid sump, a fluid strainer in said sump, a first pump drivingly connected to said input shaft, a second pump drivingly connected to said output shaft, and first and second conduit means connecting said strainer respectively to said first and second pumps, said strainer comprising a casing having a pair of strainer compartments each of which has an outlet port connected to a different one of said conduits and a portion of its compartment walls formed of fluid filter material, said compartments being separated by baffle means that prevents a direct fluid flow path from the outlet port in one compartment to the outlet port in the other compartment, and one of said compartments having an air escape trap means in a wall thereof arranged adjacent said baffle means to permit air entrapped in the fluid impinging on said baffle means to escape through the air trap to the top surface of the fluid in the sump.

3. In an engine driven power transmission unit including an engine driven input shaft and an output shaft arranged to be drivingly connected by gearing for the transmission of a forward and a reverse drive, hydraulically operated control means for said transmission comprising a fluid sump, a fluid strainer in said sump, a first pump drivingly connected to said input shaft, a second pump drivingly connected to said output shaft, and first and second conduit means connecting said strainer respectively to said first and second pumps, said strainer comprising a casing having a pair of strainer compartments each of which has an outlet port connected to a different one of said conduits and a portion of its compartment walls formed of fluid filter material, said compartments being separated by baffle means that prevents a direct fluid flow path from the outlet port in one compartment to the outlet port in the other compartment, and one of said compartments having an air escape trap means in a wall thereof, the outlet port and the air trap in said one compartment being arranged in superimposed relation to said baffle means.

4. An oil strainer comprising a base plate having a pair of spaced ports therein adapted to be connected to a pair of pumps, a pair of separated compartments connected to said base plate each of which is connected to a different one of said ports and each of which has wall portions formed of fluid filter material, a baffle means connected to said base plate and arranged adjacent one of said ports to prevent direct fluid flow from said one port to the port in the other compartment, said baffle means and said one port being arranged in superimposed relationship.

5. An oil strainer comprising a base plate having a pair of spaced ports therein adapted to be connected to a pair of pumps, a pair of separated compartments connected to said base plate each of which is connected to a different one of said ports and each of which has wall portions formed of fluid filter material, a baffle means connected to said base plate and arranged adjacent one of said ports to prevent direct fluid flow from said one port to the port in the other compartment, said baffle means and said one port being arranged in superimposed relationship and said compartment connected to said one port including an air escape trap.

6. An oil strainer comprising a base plate having a pair of spaced ports therein adapted to be connected to a pair of pumps, a pair of separated compartments connected to said base plate each of which is connected to a different one of said ports and each of which has wall portions formed of fluid filter material, a baffle means connected to said base plate and arranged adjacent one of said ports to prevent direct fluid flow from said one port to the port in the other compartment, said baffle means and said one port being arranged in superimposed relationship and said compartment connected to said one port including an air escape trap formed from perforated filter material mounted in an opening in said base plate.

7. An oil strainer comprising a base plate having a pair of spaced ports therein adapted to be connected to a pair of pumps, a pair of separated compartments connected to said base plate each of which is connected to a different one of said ports and each of which has wall portions formed of fluid filter material, a baffle means connected to said base plate and arranged adjacent one of said ports to prevent direct fluid flow from said one port to the port in the other compartment, said baffle means and said one port being arranged in superimposed relationship and said compartment connected to said one port including an air escape trap that is also arranged in superimposed relationship relative to said baffle means.

8. An oil strainer comprising a base plate having a pair of spaced ports therein adapted to be connected to a pair of pumps, a pair of separated compartments connected to said base plate each of which is connected to a different one of said ports and each of which has wall portions formed of fluid filter material, a baffle means connected to said base plate and arranged adjacent one of said ports to prevent direct fluid flow from said one port to the port in the other compartment, said baffle means and said one port being arranged in superimposed relationship and said compartment connected to said one port including an air escape trap that is also arranged in superimposed relationship relative to said baffle means and comprises a dome-shaped perforated formation of relative large area compared to the area of said one port.

9. In an engine driven power transmission unit including an engine driven input shaft and an output shaft arranged to be drivingly connected by gearing for the transmission of a forward and a reverse drive, hydraulically operated control means for said transmission comprising a fluid sump, a fluid strainer in said sump, a first pump drivingly connected to said input shaft, a second pump drivingly connected to said output shaft, and first and second conduit means connecting said strainer respectively to said first and second pumps, said strainer comprising a casing having a pair of strainer compartments each of which has an outlet port connected to a different one of said conduits and a portion of its compartment walls formed of fluid filter material, said compartments being separated by baffle means that prevents a direct fluid flow path from the outlet port in one compartment to the outlet port in the other compartment, said baffle means comprising a dished plate surrounding that portion of the fluid filter material of one compartment that is in the direct path of fluid flow between the ports in said compartments such that fluid flow between the ports will be redirected away from fluid flow path when one port is open to suction and the other port is open to discharge to permit any entrapped air in the circulating fluid to separate therefrom before the fluid enters the suction port.

References Cited in the file of this patent
UNITED STATES PATENTS

| | | |
|---|---|---|
| 1,421,440 | Fisher | July 4, 1922 |
| 1,703,143 | Greve | Feb. 26, 1929 |
| 1,913,193 | Crawford | June 6, 1933 |
| 2,041,495 | Schwiers | May 19, 1936 |
| 2,485,417 | Steenstrup | Oct. 18, 1949 |